United States Patent

Thom et al.

[15] 3,666,871

[45] May 30, 1972

[54] CONTINUOUS CHARGING OF AN ELECTRIC ARC STEELMAKING FURNACE

[72] Inventors: Gee Wing Thom, Hamilton, Ontario; Keith Wilson, Burlington, Ontario, both of Canada

[73] Assignees: The Steel Company of Canada Limited, Hamilton, Ontario, Canada; Metallgesellschaft A.G., Frankfurt am Main, Germany

[22] Filed: June 18, 1970

[21] Appl. No.: 47,449

[52] U.S. Cl. ....................13/33, 266/28

[51] Int. Cl. ....................F27d 3/10

[58] Field of Search ....................13/9, 33, 34; 266/28; 75/10, 75/11, 12, 51

[56] References Cited

UNITED STATES PATENTS

| | | | |
|---|---|---|---|
| 3,472,649 | 10/1969 | Sibakin et al. | 75/10 R |
| 3,210,129 | 10/1965 | Penner | 266/28 X |

*Primary Examiner*—Bernard A. Gilheany
*Assistant Examiner*—R. N. Envall, Jr.
*Attorney*—Fay, Sharpe and Mulholland

[57] ABSTRACT

A method of steelmaking in a three phase direct arc electric furnace having a slag covered bath of molten iron bearing metal. The furnace is charged through its roof by at least three ducts and includes propelling means for directing the charge toward the bath at an angle to the horizontal in the range 40–80°.

12 Claims, 3 Drawing Figures

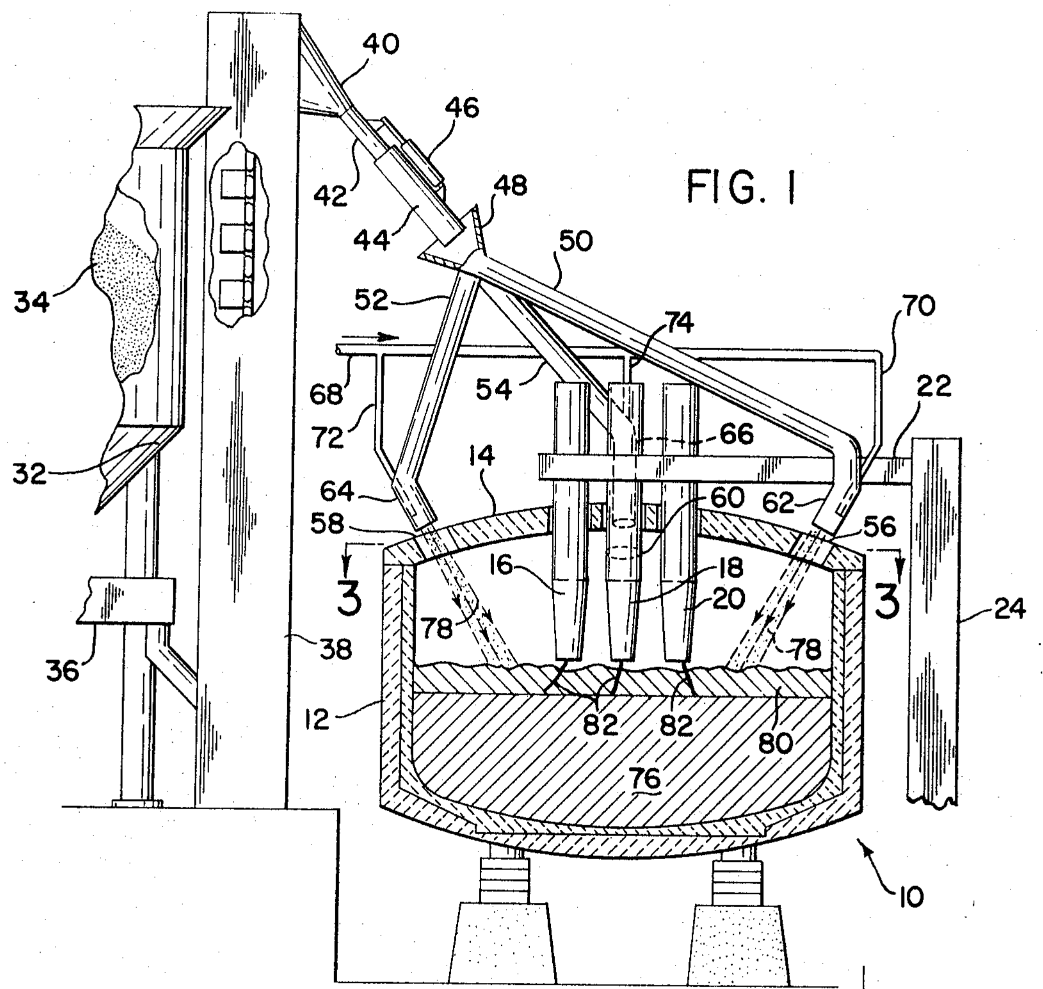
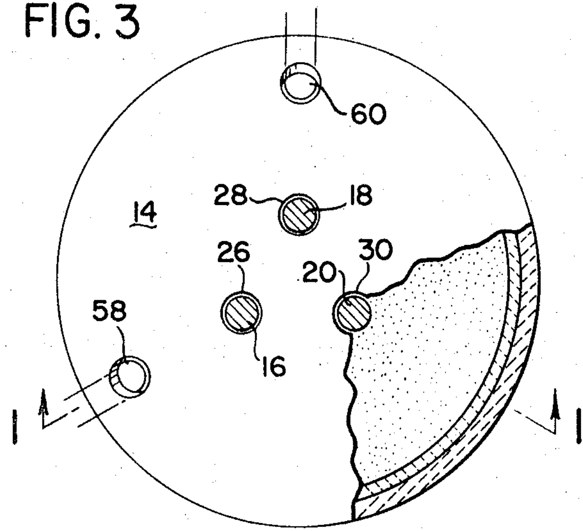
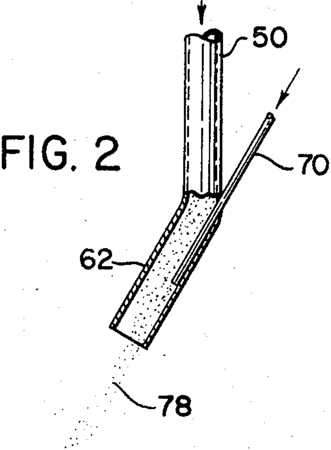
INVENTORS.
GEE WING THOM &
KEITH WILSON
BY
Fay, Sharpe & Mulholland
ATTORNEYS

CONTINUOUS CHARGING OF AN ELECTRIC ARC STEELMAKING FURNACE

BACKGROUND OF THE INVENTION

Conventional electric arc steelmaking furnaces include a substantially circular enclosure lined with appropriate refractory material. The top is often removable for purposes of charging the furnace with the raw materials for the steelmaking process. Electrodes extend through openings in the roof of the furnace.

Most prior art furnaces of this type require shut down, removal of the electrodes and removal of the roof for each charge to be deposited in the furnace. A charging time of 4 to 7 minutes is considered normal for modern steelmaking furnaces. It is evident that elimination of these interruptions for recharging would result not only in shorter heat time but also in reduced energy consumption per ton of steel produced since considerable heat is lost from the furnace chamber by radiation and convection when it is opened. After the charge the heat lost must again be added by the electric arc.

No detailed description of the conventional process of steelmaking other than the method of charging appears necessary as the processes are well known in the art and this invention deals primarily with a new method of charging to the furnace while it is in operation. The term "steelmaking" where used herein is intended to include making an iron-carbon alloy where the carbon is in the approximate range of from 0.02 to 1.8 percent by weight and the other constituents are adjusted to levels so that the said alloy will have the desired physical characteristics.

More recent innovations in the field have included continuous feeds of those materials for steelmaking through apertures in the furnace. Even with known continuous feeding methods there are problems. For example, when the charge is dropped trough apertures in the furnace roof some of the material will not penetrate the slag layer. The solid material which deposits on the upper surface of the slag is referred to in the art as "an iceberg." The formation of icebergs raises two problems. The first is that the icebergs will not easily melt while lying on the top of the slag. The second problem is that the electrode tends to arc into the iceberg thereby radiating intensive heat to the walls and roof of the furnace. There is a direct relationship between the radiant heat and the deterioration of the refractory lining the furnace. The more frequent the exposure of the refractory to the radiation source, the more rapid is the deterioration of the refractory.

BRIEF DESCRIPTION OF THE INVENTION

These problems have been minimized by this invention by propelling the charge toward the molten bath from ducts located radially outward from the electrodes at an angle in the range 40–80° with respect to the horizontal.

Preferably, at least three ducts are provided, one being located radially outward of each of the electrodes. A compressed air feed is incorporated in the discharge end of each of the ducts. The discharge ends of the ducts are angled toward the center of the furnace at an angle in the range 4–80° with respect to the horizontal and the compressed air propels the charge from the discharge end of the ducts along the angle of the duct.

The propelled material descends in a continuous flow and because it is propelled in a path between the electrode and the furnace wall, in effect it tends to form a curtain to help shield the furnace wall from the arc.

As is well known in conventional steelmaking furnaces of this type, convection currents within slag tend to flow from the electrode substantially radially outwardly toward the furnace wall and then along the furnace wall to a point along a radial line intermediate between two electrodes, inward along the radial line back toward the center of the furnace and again outward past the electrode. What this does is cause the hottest slag or that most recently heated by the arc to flow outwardly and into contact with the furnace wall. This invention retards and substantially eliminates this direction of slag flow and produces reverse flow of the slag. Thus, the slag will have more chance to transfer heat to the molten metal before it arrives to contact the furnace wall.

Another aspect of this invention is that the velocity with which the charge is propelled from the discharge end of the ducts must be adequate to cause the charge to penetrate below the upper surface of the slag because of the previously explained detrimental effects resulting from icebergs which form from a charge resting substantially on the top surface of the slag.

U.S. Pat. No. 3,432,606, issued Mar. 11, 1969 to J. J. Kociscin, broadly discloses "blowing" particles from a discharging duct toward a zone close to the arc. The instant invention is distinct in several instances, for example: (1) the particle size, (2) the rate of material feed, (3) the induced slag flow pattern, (4) the angle at which the material is propelled into the furnace and (5) the momentum of the particles of material impinging on the upper slag surface.

Objects of the invention will become obvious from a detailed reading of the specification.

BRIEF DESCRIPTION OF THE DRAWINGS

FIG. 1 is a schematic illustration, in part, of an electric arc furnace and the charging system for continuous feeding of a charge to an open bath in the furnace.

FIG. 2 is an enlargement, partially in section, of the discharge end of a charging duct and the propelling mechanism.

FIG. 3 is a sectional view taken along line 3—3 of FIG. 1.

PREFERRED EMBODIMENTS

FIG. 1 shows a furnace 10 having a cylindrical, refractory lined side wall 12 with a removable roof 14. The roof 14 is adapted to be removed in a conventional manner and the procedure will not be described in detail.

Three electrodes 16, 18, 20 are mounted on arms 22, which are affixed to a mast 24. As best seen in FIG. 3 the electrodes extend through openings 26, 28, 30 in the roof 14. As is conventional in most furnaces of this type, the electrodes are oriented in a substantially triangular pattern near the center of the furnace. No detailed description of how the electrodes are raised, lowered and adjusted within the furnace appears necessary as such is well known to those having ordinary skill in the art.

The automatic continuous charging means will now be explained with particular reference to FIG. 1. A hopper 32 containing a charge 34 for the furnace is located adjacent the furnace. The showing of the single hopper is merely illustrative as a plurality of hoppers could be supplied if necessary and the charge 34 may comprise sponge iron, lime, iron ore and combinations thereof as necessary in the particular steelmaking process. A weighing feeder 36 is located below the hopper and serves to feed a bucket elevator 38. The bucket elevator dumps the charge into a splitter box 40 connected to three tubes 42.

It is important that the tubes 42 be angled downwardly at an angle greater than the angle of incidence of the particular bulk material comprising the charge 34. It is clear that if the tubes 42 are not so angled, the charge will not fall by gravity through the tubes and continue on to the furnace. Experiments have indicated that with most conventional materials an angle of 40° with respect to the horizontal is adequate to cause the charge to flow by gravity down the tubes 42.

Tube extensions 44 lead from the tubes 42 and are telescopically adjustable by pneumatic or hydraulic piston cylinder units 46. The extensions 44 are to be aligned with funnels 48 which are the inlets to charging ducts 50, 52, 54. Each duct leads to a spot above openings 56, 58, 60 in the roof 14 of the furnace. Each of the ducts 50, 52, 54 includes a substantially vertical section immediately adjacent an angled discharge end 62, 64, 66, respectively, which forms an angle with respect to the horizontal in the range 40–80°.

A tube 68 having branches 70, 72, 74 conducts compressed air from a source (not shown) into the angled discharge ends of the ducts. Its purpose is to propel the charge toward the molten bath 76 within the furnace 10 with sufficient force so that the charge 78 penetrates the slag layer 80 and will be embedded deep in the slag, perhaps to the slag-molten metal interface or even in some cases into the molten metal bath itself.

It was determined that when the charge 78 is propelled toward the bath 76 at an angle in the range 40–80° it will tend to penetrate the slag layer 80. However, it is believed that when the angle is reduced below 40° the charge will tend to skip along the surface of the slag and when the angle is increased over 80° the charge tends to build up into icebergs floating on the top of the slag surface.

Not only is the angle of impingement important, the mass of the individual particles is also critical. For convenience the mass will be related to particle size. Preferable, the diameter of the particles propelled should be approximately in the range 0.18 to 0.63 inches with a mean size of about 0.375 inches. With the size above specified, the momentum of the particles will carry them below the slag surface toward the bath where they can nucleate the boil, when they impinge at an angle within the critical range.

Because the charge 78 is continuously fed into the furnace while the electrodes 16, 18, 20 are in operation and melting the components of the final steel product, it serves to form a sort of curtain between the furnace wall 12 and the arcs 82, thereby reducing somewhat the radiant heat impinging on the furnace wall.

In addition, it will be noted in FIG. 1 that when the charge is propelled toward the bath 76 in the manner shown and described, it serves a very useful purpose. It tends to reverse the circulation of the hot slag causing it to flow from the wall, toward the electrode, then to one side and back toward the wall, rather than the previous circulation pattern without the propelled charge, which was from the electrode radially outwardly toward the wall. Because the propelled charge 78 pushes the slag toward the electrode it tends to keep the arcs substantially submerged in the slag layer. The resulting reduction in the rate of deterioration of the furnace walls due to radiant heat from the arcs 82 is substantial and greatly increases the useful life of the furnace refractory.

The particular means for charging the furnace described by this invention has resulted in a more efficient heat transfer to the melt than prior devices and it is believed that the cause of the improvement is the angled discharge end of the feeding ducts and the propelling mechanism provided. The sponge iron which is propelled deep into the slag layer is porous and includes some air. The oxygen in the air tends to react quickly with iron and such carbon as may be in the melt to provide a vigorous boiling of the slag in the vicinity of the electrode. In addition, the direction of the injection of the charge is such that the slag in the furnace is pushed toward the electrode thereby causing a stirring action within the furnace.

As in illustration of the effectiveness of this invention, an experiment was conducted in a furnace where one duct was angled and the compressed air propelling mechanism was applied as shown in FIG. 2. This mechanism was applied to only one of the feeding ducts adjacent only one of the electrodes. The other two electrodes were fed with the conventional feed which is a gravity drop into the bath. In this furnace the normal feed rate is about 450 to 500 pounds per minute distributed through three ducts. Thus, each duct feeds between 150 and 167 pounds per minute to the bath. When the feed rate of the conventional feeds was raised to 200 pounds per minute, icebergs often formed on the slag. With this invention the duct having the angled discharge end and the compressed air propelling means, a feeding rate of 675 pounds per minute using particles of the preferred size was tried and the material melted readily without apparent signs of icebergs. The bath boiled much more vigorously than with normal continuous feed practices and it seems clear that this invention improves furnace productivity, imparts an improved stirring and boiling action to the melt and reduces the rate of deterioration of refractory.

As would be obvious to one having ordinary skill in the art other propelling means might be employed rather than compressed air. Other propelling means are within the scope of the invention so long as the angle of impingement of the charge on the slag layer is maintained and adequate momentum is imparted to the charge to cause it to penetrate deep into the slag layer.

While the described embodiment includes only one single discharge duct spaced radially outward from each of the three electrodes it is obvious that a plurality of discharge ducts might be employed. It must be kept in mind, however, that it is important that the charge be directed into the slag layer radially outward of the electrodes and that the propelled charge not impinge on the electrodes themselves as this causes the undesirable arcing which exposes the refractory furnace walls to the elevated temperatures and increases radiant heat deterioration.

The increased heat transfer provided by this invention is believed to be the result of the charge penetrating deep into the slag as solid particles rather than melted globules. As is well known in the heat transfer art, imperfections in a wall or heat transfer surface serve as bubble formation points which tend to increase heat transfer. As chemistry students learn when they apply Bunsen burner heat to a beaker filled with water, bubble formation begins at the point imperfections. They illustrate this by putting a glass tube into the beaker. The bubbles form at the point of contact between the tube and the beaker bottom. The instant invention is merely another illustration of this point imperfection phenomena. It is believed that the sponge iron particles serve as "point imperfections" and provide bubble formation points which increases the boiling action and circulation of the slag and molten metal, thereby increasing the vigorous boiling action and heat transfer overall.

The invention claimed is:

1. The process of making steel having carbon in the approximate range of from 0.02 percent to 1.8 percent by weight and the other constitutents in a refined state in a three phase direct arc electric furnace comprising, initially charging the furnace and melting the charge to produce a slag covered bath of molten metal, subsequently charging said furnace with discrete iron-bearing material by forcibly propelling said material toward the bath at an angle to the horizontal in the range 40–80° and melting and refining the metal to produce steel.

2. The process of claim 1 in which the step of charging by propelling the discrete iron-bearing material is performed by ejecting the material from at least three ducts, each duct being located radially outward of an electrode and spaced from the electrode a distance sufficient substantially to prevent the propelled charge from striking the electrode.

3. The process of claim 1 in which the step of charging by propelling the discrete iron-bearing material is performed by impinging the charge against the upper surface of the slag whereby the slag tends to be pushed toward the electrodes.

4. The process of claim 1 in which the step of charging by propelling the discrete iron-bearing material is performed to increase the heat transfer to the bath by propelling the material with a momentum such that it penetrates into the slag while substantially in a solid state thereby providing bubble formation points to increase boiling action within the furnace.

5. In the process of claim 1, propelling the subsequent charge with compressed air.

6. In the process of claim 1, propelling the subsequent charge through openings in the furnace roof toward the bath.

7. The process of claim 1 in which the step of charging by propelling includes the step of providing particles of a diameter approximately in the range 0.18–0.63 inches with a mean size of about 0.375 inches.

8. In the process of claim 1, in which the step of charging by propelling includes the step of providing a charge from the group comprising sponge iron, lime, iron ore and combinations thereof.

9. The process of claim 8 in which the step of charging by propelling the discrete iron-bearing material is performed by ejecting the material from at least three ducts, each duct being located radially outward of an electrode and spaced from the electrode a distance sufficient substantially to prevent the propelled charge from striking the electrode.

10. The process of claim 8 in which the step of charging by propelling the discrete iron-bearing material is performed by impinging the charge against the upper surface of the slag whereby the slag tends to be pushed toward the electrodes.

11. The process of claim 8 in which the step of charging by propelling the discrete iron-bearing material is performed to increase the heat transfer to the bath by propelling the material with a momentum such that it penetrates into the slag while substantially in a solid state thereby providing bubble formation points to increase boiling action within the furnace.

12. The process of claim 8 in which the step of charging by propelling includes the step of providing particles of a diameter approximately in the range 0.18–0.63 inches with a mean size of about 0.375 inches.

* * * * *